ന2,893,233

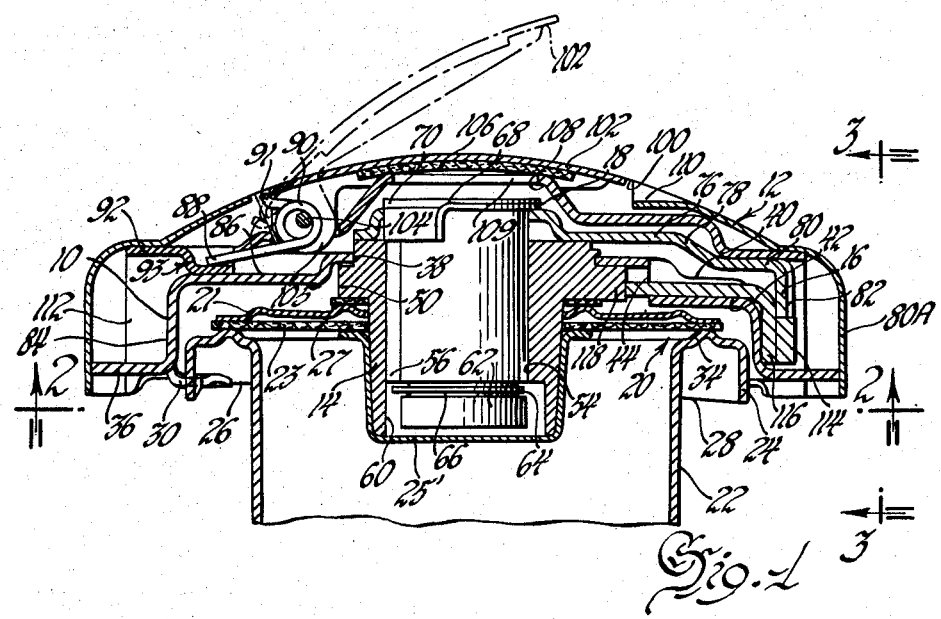
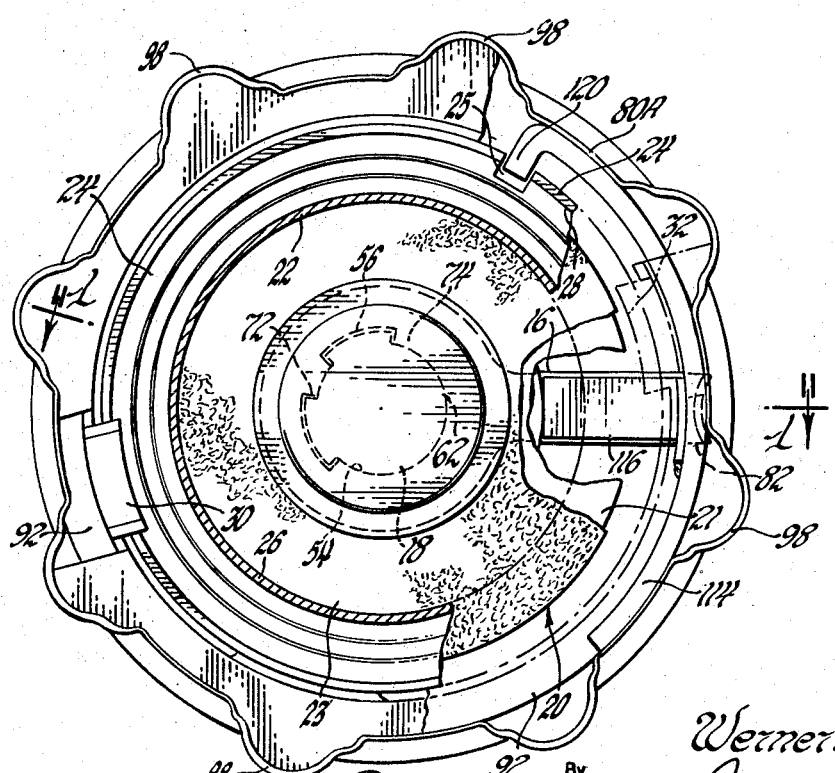

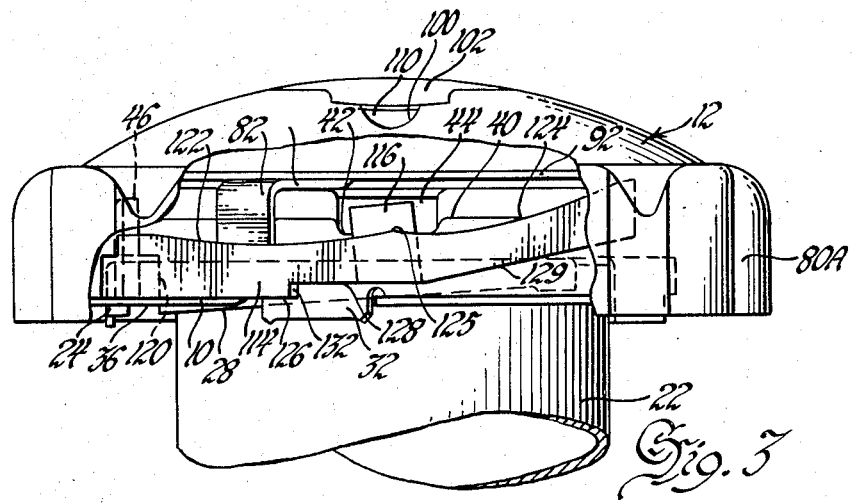
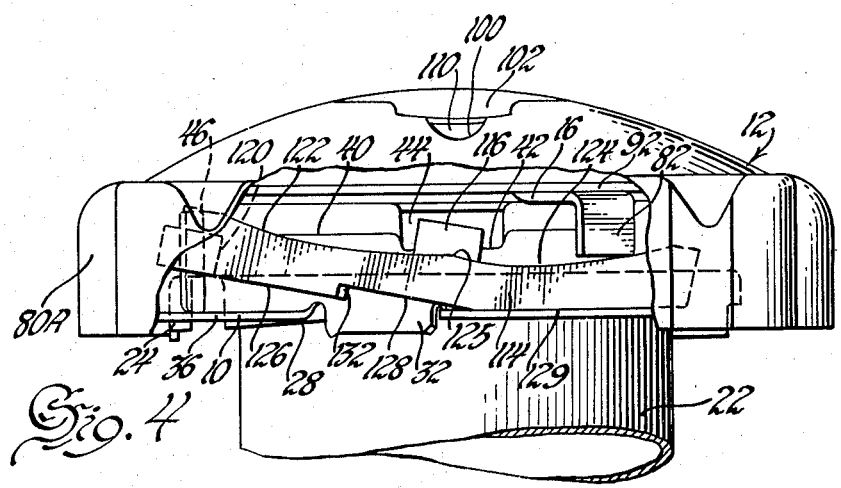
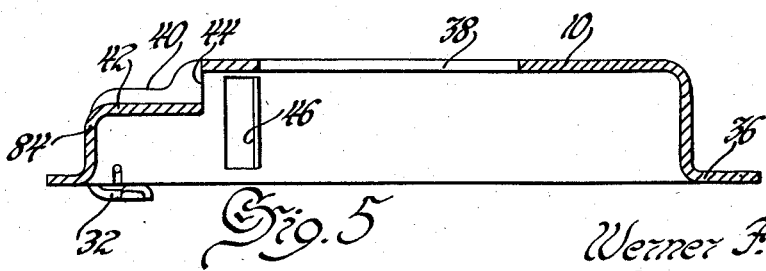

CAP DEVICE FOR A FILLER PIPE

Werner F. Schultz, Owosso, Mich., assignor to General Motors Corporation, Detroit, Mich., a corporation of Delaware Application April 25, 1955, Serial No. 503,622

6 Claims. (Cl. 70—172)

This invention relates to cap devices for filler pipes and more particularly to locking caps for liquid fuel tanks such as provided on automotive vehicles.

Gasoline tanks on automotive vehicles are customarily provided with filler tubes having caps which must afford protection from foreign material entering the tanks and which usually serve to prevent loss of the fuel by evaporation or pilferage. Caps with key-operated locks have heretofore been used for this purpose but a lock cap embodying the present invention presents a structural improvement in the use of which the closing and sealing of a filler pipe may be followed by a locking action which is positive.

It is an object of the present invention to provide an improved locking type cap device for filler tubes such as employed on gasoline tanks of vehicles.

Another object is to provide a filler cap which, after being conditioned by the use of a key, may be attached to or detached from a filler pipe having an outwardly extending flange by rotation of the cap and positively locked in the closed position by means of suitable operation of the key to prevent rotation and detachment of the cap.

To the above ends, a feature of the invention comprises a latch member with an inwardly-directed portion adapted to move into and away from a suitable recess in the filler pipe flange dependent upon the rotation of a lock cylinder by use of a key.

These and other important features of the invention will now be described in detail in the specification and then pointed out more particularly in the appended claims.

In the drawings:

Fig. 1 is a sectional view, taken along line 1—1 of Fig. 2, of a cap device showing one embodiment of the present invention and as located in closed or sealed position upon a filler pipe;

Fig. 2 is a sectional view looking in the direction of the arrows 2—2 in Fig. 1 with portions being broken away better to illustrate the invention;

Fig. 3 is an elevational view of the structure shown in Fig. 1 and looking in the direction of the arrows 3—3 but with a portion of the cover removed to illustrate the positioning of the parts for locking the cap device in closed position on a filler pipe;

Fig. 4 is a view similar to that of Fig. 3 but with the parts in their unlocked positions; and Fig. 5 is a sectional view taken through the main frame of the cap device.

The filler cap embodying one form the present invention is illustrated in the drawing as comprising a main frame 10, a main cover generally indicated at 12, a lock casing 14, a shift arm 16, a lock cylinder 18 and a sealing arrangement generally shown at 20. These parts constitute the main elements of the cap.

Fig. 1 shows the cap as located in closed position on the end of a filler pipe 22. This filler pipe is provided with an annular outwardly turned flange 24 having a special recess 25 (Fig. 2) as well as conventional cam surfaces 26 and 28 for interaction with inwardly directed tongues 30 and 32, respectively, on the main frame 10. Conventional vertical slots are provided in the flange 24 for reception of the tongues 30 and 32. If desired, the special recess 25 may be omitted and one of the conventional vertical slots aforementioned may perform its function as will further appear. The flange 24 is also provided with an annular ridge 34 constituting a seat for the resilient sealing arrangement 20. The latter comprises a spring disc 21, a resilient sealing disc 23 and a cup 25'. The latter is pressed on the end of the lock casing 14 and serves to hold the discs 21 and 23 in place. Leakage between the casing 14 and the disc 21 is prevented by a resilient washer 27.

The main frame 10 is flanged as at 36 and is cup-like in shape. It is provided with a central opening 38 in which is fixedly mounted the lock casing 14. The flange 36 has spaced projections around its periphery to conform with a sheet metal cover member as will further appear.

The frame 10 is depressed at 40 for a given arcuate distance (about 100 degrees) about the axis of the cap for a reason that will appear hereinafter. Intermediate the length of this arcuate depressed portion 40 is a deeper depression 42 which extends inwardly and terminates with an opening 44. An opening or a slot 46 is formed in the frame 10 and this opening is made rectangular in shape and its greatest width extends substantially normal to the plane of the flange 36 as is clearly shown in Fig. 5.

The lock casing 14 is provided with a shoulder portion 50 which extends around the casing and aids in fixing the frame 10 and casing 14 together in non-rotative relation with respect to each other. The casing 14 is provided with a main bore 54 in which the lock cylinder 18 is journaled and with a slot 56 which is adapted to receive a locking member assembled for operation within the lock cylinder 18. It will be understood that any type of conventional tumbler lock cylinder may be used without departing from the spirit of the present invention. In the present instance a member or members from the cylinder 18 extend into the slot 56 to lock the cylinder in fixed relation with the casing 14. When the cap device is unlocked by use of the key, the lock cylinder 18 is made free to rotate within and with respect to the casing 14. One end of the casing 14 is provided with bore 60 into which one end 62 of the lock cylinder extends. This end is grooved as at 64 for the reception of a spring washer 66. This washer maintains the lock cylinder 18 in its proper axial position with respect to the casing 14 and is aided in this by an enlarged head 68 formed on the cylinder 18 and contacting a shoulder portion 70 formed on the shift arm 16. The lock cylinder 18 is formed with two arcuate recesses 72 and 74 (Fig. 2) for the reception of inwardly extending tongues on the annular portion of the shift arm 16. This assures non-rotative relation between the lock cylinder and the shift arm.

A portion 76 of the shift arm extends outwardly and perpendicular to the axis of the lock cylinder 18 and then inclines at 78 towards the frame 10, after which it again extends radially as at 80 for a short distance to terminate in a portion 82, the end of which is clear of the outside surface 84 of the frame 10. This portion 82 is curved as best shown in Fig. 2. The depressed arcuate portion 40 of the frame is of such extent annularly as to permit adequate rotation of the shift arm and the lock cylinder to permit a locking or unlocking movement. The frame 10 is also depressed as at a localized area 86 for the reception of the straight end portion 88 of a coil spring 90. The other end 91 of the spring resiliently engages the edge of a small cover hereinafter referred to.

The cover 12 includes a plate 92 which is affixed with relation to the frame 10. This plate has a depressed portion 93 conforming with the depression 86 for receiving the spring end 88 and an outer contour conforming somewhat with that of the flange 36 of the main frame but having a smaller over-all diameter. The cover 12 also includes a sheet metal member 80A which is made in the form of a cup with eight spaced and outwardly extending knobs 98 thereon. It will be understood that the sheet metal 80A may be attached to the plate 92 and the frame 10 by crimping or otherwise and thereby serve as a means for holding those parts in assembly. An opening 100 is formed in the sheet metal member 80A of the cover to accommodate a pivoted small cover 102. This cover is arranged substantially to close the opening 100 and is biased to a closed position by the spring 90 which surrounds a pivot pin 104 supporting the cover through ears 105 integral with the cover 102. Similar ears (not shown) are made integral with the member 80A for supporting the pin 104. Attached to the inside of the small cover 102 is a resilient sheet 106 which constitutes a stop against a marginal portion 108 forming a part of the plate 92 and surrounding an opening 109 through which a key may be inserted for operation of the lock cylinder. The sheet 106 contributes quietness in the closing of the small cover and also serves as a seal against foreign matter. A notch 110 is formed in the sheet metal 80A to permit the cover to be lifted.

It will be understood that a different type of small cover arrangement may be employed without departing from the spirit of the present invention. A cover which will snap open or closed would be suitable or a sliding cover could be used.

The frame 10 and the sheet metal portion 80A of the cover cooperate to define an annular chamber 112 in which is tiltably located an arcuate latch member 114. This member has rigidly affixed to it one leg of a right angle member 116. The other leg of this member extends loosely through the slot 44 of the frame 10 and loosely abuts an extended portion 118 (Fig. 1) of the annular shoulder 50. The latch member 114 is arcuate in form permitting it to extend along the chamber 112 and one end is provided with a locking portion 120 extending inwardly through and beyond the opening 46 in the frame 10. The top edge of the latch member 114 is provided with two surfaces 122 and 124, each of which is concave and these extend in series along the length of the latch member to meet and form a ridge 125. The underside of the latch member comprises three flat surfaces 126, 128 and 129 extending in series along the length of the latch member. The surface 128 is intermediate the other two surfaces and is separated from the surface 126 by a shoulder 132. It will be noted that the surfaces 126 and 129 lie in planes intersecting at a slight angle permitting the member 114 to tilt as will further appear.

In applying the cap device to the filler pipe 22, a key is first employed to turn the lock cylinder 18 to its unlocked position and with relation to the casing 14. This will turn the shift arm 16 so that its end or curved portion 82 will engage the concave surface 124 of the latch member 114. As a consequence, the latter will tilt into its position with relation to the flange 36 as shown in Fig. 4. The shift arm cannot bend away from the member 114 as the arm portion 80 is backed up by the plate 92. The cap device is then applied to the flange 24 of the filler pipe with the tongues 30 and 32 registering with suitable gaps in the flange 24 as is conventional. The cap is then rotated with relation to the pipe. As a result, the tongues 30 and 32 will engage the cam surfaces 26 and 28 of the flange until the cap is firmly closed with the sealing arrangement 20 seated on the annular ridge 34. The cap device is then closed but not locked.

In order to lock the cap, the key is again employed to turn the lock cylinder 18 so that the shift arm portion 82 will swing to the other half of the latch member. As a consequence, the shift arm portion 82 will engage the concave surface 122 and tilt the latch member 114 from its position shown in Fig. 4 to that assumed in Fig. 3. When this occurs, the locking portion 120 will shift downwardly within the slot 46 in the frame and will engage the recess 25 in the flange 24 of the filler pipe. As a consequence, the cap device cannot be turned from its closed position and it cannot be removed axially from the pipe because of the tongues 30 and 32.

The right angle member 116 serves to prevent lateral or undue tipping or turning of the latch member 114 toward or away from the frame 10 and the shift arm 16 is prevented from moving axially with respect to the lock cylinder 18 because of the abutting portion of the plate 92 either in locking or unlocking the cap. It will be appreciated that the portion 80 of the shift arm is arranged to move in the depressed portion 40 of the frame and upon turning of the lock cylinder any force exerted by the concave surfaces of the latch member is resisted by the arm contacting the plate 92 but friction between the latter and the arm has been found to be of no consequence. The opening 44 in the frame is of such size as to permit the required tilting of the latch member and its right angle portion 116.

To unlock the cap device, all that is necessary is to employ the key to turn the lock cylinder 18 and the shift arm to place the latch member in its position as shown in Fig. 4. This moves the locking portion away from the recess 25 in the pipe flange 24. The cap device is then unlocked and free to be rotated with respect to the filler pipe until the tongues 30 and 32 are in registry with their releasing recesses of the pipe flange. The cap may then be removed from the pipe.

The arcuate or concave surfaces 122 and 124 on the latch member are provided as a preferred structural feature. It will be appreciated that if only one arcuate or concave surface were substituted for the two surfaces 122 and 124, that the portion 82 of the shift arm would necessarily engage the latch member at an angle which may be such as to render turning of the key difficult. With the preferred construction as illustrated, the angle of the surface 122 or 124 with respect to the direction of travel of the shift arm portion 82 is such that very little effort in turning the key will tilt the latch member. This angle should be determined for a given cap so that it will not be too small and thereby cause the shift arm and latch member 114 to be wedged between the plate 92 and the flange and thereby made difficult to release by turning of the key. It also should not be too large for, when locking the cap, the arm should slide easily along the member 114 positively to insert the locking portion 120 into the pipe flange recess 25. There is a considerable latitude in determining this angle for satisfactory operation.

As stated heretofore, the conventional slots or gaps in the flange 24 may be so used as to eliminate the need for the recess 25. In such a case, the rotation of the tongues 30 and 32 to close the cap is continued until a stop surface on flange 24 is engaged at which time the locking portion 120 will be placed in position for entrance into one of the two conventional slots for locking by use of the lock key. The excess width of such a slot for the reception of the portion 120 is immaterial as only one edge of the slot need be engaged to prevent rotation and opening of the cap.

I claim:

1. A cap device for a filler pipe having an annular outwardly turned flange with a recess therein and means for securing said device in closed position upon relative rotation of the device and pipe, said device including means for cooperating with said securing means, a main frame supporting said cooperating means and having a radially extending opening, a lock cylinder journaled in said frame, a cover encompassing said frame and therewith defining an annular chamber of an inner diameter greater than the outer diameter of said flange, a latch member having an arcuate cam portion in said chamber and a locking portion extending inwardly through and beyond said radial opening, said arcuate cam portion extending along the length of said annular chamber, a shift arm arranged to rotate with said cylinder when the latter is released by a key, and an outer end of said shift arm being adapted upon rotation to engage said cam portion and tilt said latch member and move said locking portion in a path substantially parallel with the axis of said lock cylinder and into and away from said pipe flange recess when said device is in sealing relation on said pipe.

2. A cap device for a filler pipe having an annular outwardly turned flange with a recess therein and means for securing said device in sealing relation with the said pipe upon relative rotation of the device and pipe, said device including a main frame, an opening extending radially in said frame, sealing means adapted to engage the said pipe flange and supported on said frame, a lock cylinder journaled in said frame, a cover encompassing said frame and therewith defining an arcuate chamber coaxial with said lock cylinder, an arcuate latch member extending along the length of said chamber, said member having a cam portion in said chamber and a locking portion extending inwardly through and beyond said frame opening, and a shift arm arranged to rotate with said cylinder and having an outer end adapted to engage and thereby tilt said cam portion with relation to said frame for moving said locking portion into and away from said recess when said device is in sealing position on said pipe.

3. A cap device for a filler pipe having an annular outwardly turned flange with a recess therein and means for securing said device in closed position upon relative rotation of the device and pipe, said device including means for cooperating with said securing means, a main frame supporting said cooperating means and having a radially extending opening, a lock cylinder and shift arm arranged to rotate together in said frame when said cylinder is released by a key, a cover encompassing said frame and therewith defining a chamber of greater diameter than said flange, a latch member having a cam portion in said chamber and a locking portion extending inwardly through and beyond said radial opening, said latch member being tiltable, said cam portion having surfaces generated from different centers and so placed as to be in the path of an outer end of said shift arm, said latch member having a length coaxial with said shift arm and a contour making it tiltable with relation to said frame with pivotal contact with one surface of the latter, and the arrangement being such that rotation of said shift arm serves to tilt said latch member and move said locking portion in a direction substantially parallel with said cylinder and into and away from a locking position with respect to said pipe.

4. A cap device for a filler pipe, said device including a main frame having a radial opening, a lock cylinder and shift arm arranged to rotate together with relation to said frame, said shift arm having an end extending outwardly, a cover encompassing said frame and therewith defining an annular chamber coaxial with said cylinder, a latch member having a cam portion in said chamber and a locking portion extending inwardly through said frame opening, said cam portion being elongated and extending along said annular chamber, said latch member being in the path of said shift arm end, and said locking portion being movable in a path substantially parallel with the axis of said cylinder when said cam portion is contacted and actuated by said shift end arm.

5. A cap device for a filler pipe having an annular outwardly turned flange with a recess extending in a direction parallel with the axis of the pipe and means for securing said device in sealing relation with the said pipe upon rotation of the device relative to the pipe, said device including a main frame with a cylindrical wall having a diameter exceeding that of said flange, an opening extending radially through said wall, a lock cylinder journaled in said frame, a cover encompassing said frame and cooperating with said wall to define a chamber, a latch member having an elongated arcuate cam portion in said chamber and a locking portion extending toward said lock cylinder through and beyond said wall opening, said lock cylinder, chamber and elongated cam portion being substantially coaxial said latch member being tiltable in a direction parallel with the axis of said lock cylinder about a point of contact of said latch member with a surface of said main frame, and a shift arm arranged to rotate with said cylinder and having an outer end adapted to engage and tilt said latch member upon such shift arm rotation for moving said locking portion in said direction and into and away from said recess when said device is positioned on said pipe flange.

6. A cap device for a filler pipe having an annular outwardly turned flange with a recess extending in a direction parallel with the axis of said pipe, said device including a main frame with a cylindrical wall adapted to encompass said flange and defining a radially extending opening, a lock cylinder releasably journaled in said frame, a cover cooperating with said wall to define a chamber coaxial with said cylinder, a latch member having an elongated arcuate cam portion extending along said chamber and bearing with line contact against a surface of said frame, a locking portion on one end of said cam portion and extending toward said lock cylinder through said opening, a shift arm arranged to rotate with said cylinder and having an outer end adapted to engage said latch member to rock the latter with said line contact as a fulcrum upon rotation of said locking cylinder for moving said locking portion into and away from said opening and also with respect to said recess when said device is positioned on said flange.

References Cited in the file of this patent

UNITED STATES PATENTS

| | | |
|---|---|---|
| 1,471,157 | Gruber | Oct. 16, 1923 |
| 2,681,559 | Friend | June 22, 1954 |
| 2,747,763 | Sach | May 29, 1956 |